United States Patent
Baba

(10) Patent No.: US 12,225,097 B2
(45) Date of Patent: Feb. 11, 2025

(54) MONITORING DEVICE, NETWORK DEVICE, CONTROL METHOD OF MONITORING DEVICE, CONTROL METHOD OF NETWORK DEVICE, AND RECORDING MEDIUM

(71) Applicant: CANON KABUSHIKI KAISHA, Tokyo (JP)

(72) Inventor: Shohei Baba, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/177,331

(22) Filed: Mar. 2, 2023

(65) Prior Publication Data

US 2023/0291643 A1 Sep. 14, 2023

(30) Foreign Application Priority Data

Mar. 8, 2022 (JP) .................. 2022-035093

(51) Int. Cl.
*H04L 67/56* (2022.01)

(52) U.S. Cl.
CPC .................. *H04L 67/56* (2022.05)

(58) Field of Classification Search
CPC . H04L 41/06; H04L 41/0627; H04L 41/0803; H04L 41/0806; H04L 41/0813; H04L 41/0816; H04L 43/0811; H04L 43/0817; H04L 67/50; H04L 67/56; H04L 67/562; H04L 67/563; H04L 41/12; H04L 67/51; H04N 1/00002; H04N 1/00244; H04N 1/00323; H04N 1/00344
See application file for complete search history.

(56) References Cited

U.S. PATENT DOCUMENTS

| | | | | |
|---|---|---|---|---|
| 2006/0277446 A1* | 12/2006 | Ikeno | .......... | H04N 1/00323 714/47.3 |
| 2013/0145221 A1* | 6/2013 | Kaneko | .......... | H04L 41/12 709/224 |
| 2015/0081859 A1* | 3/2015 | Xu | .......... | H04L 41/0806 709/222 |
| 2015/0256544 A1* | 9/2015 | Wu | .......... | H04L 67/56 726/12 |
| 2016/0065430 A1* | 3/2016 | Hirahara | .......... | H04L 41/0853 709/224 |

(Continued)

FOREIGN PATENT DOCUMENTS

| | | | | | |
|---|---|---|---|---|---|
| JP | 2005354516 A | * | 12/2005 | .......... | H04N 1/00 |
| JP | 2018136876 A | * | 8/2018 | .......... | G06F 13/00 |

*Primary Examiner* — Vivek Srivastava
*Assistant Examiner* — William C McBeth
(74) *Attorney, Agent, or Firm* — ROSSI, KIMMS & McDOWELL LLP

(57) ABSTRACT

A processor of a monitoring device having a proxy function that relays communication between a device management service and a network device set, to the network device, a proxy setting by using access information to a proxy function of the monitoring device, if an event based on a failure of device registration with the device management service is received from the network device and the network device is a management target of the monitoring device; and transmit device registration instruction regarding the network device to the device management service to which the proxy setting has been set.

8 Claims, 14 Drawing Sheets

(56) References Cited

U.S. PATENT DOCUMENTS

| | | | |
|---|---|---|---|
| 2016/0218945 A1* | 7/2016 | Hirahara | H04L 41/0853 |
| 2016/0248746 A1* | 8/2016 | James | H04L 67/51 |
| 2017/0024172 A1* | 1/2017 | Oshima | H04L 41/0806 |
| 2017/0295164 A1* | 10/2017 | Sakurai | H04L 63/062 |
| 2018/0034897 A1* | 2/2018 | Moriyama | H04L 67/14 |
| 2019/0280952 A1* | 9/2019 | Sizer | H04L 43/0817 |
| 2020/0137166 A1* | 4/2020 | Aoki | H04L 41/0853 |
| 2021/0208827 A1* | 7/2021 | Shiraga | G06F 3/1285 |
| 2021/0274053 A1* | 9/2021 | Yano | H04N 1/00344 |
| 2021/0337403 A1* | 10/2021 | Jang | H04L 41/069 |
| 2023/0231763 A1* | 7/2023 | Nedungadi | H04L 41/0627 714/4.11 |

* cited by examiner

FIG. 9

| 901 | 902 | 903 | 904 | 905 | 906 | |
|---|---|---|---|---|---|---|
| Device ID | Device name | IP address | MAC address | Management status | Registration status | |
| AAA0001 | Device A | 11.11.11.11 | 11:11:11:11:11:11 | Management target | Registered | ... |
| BBB0001 | Device B | 22.22.22.22 | 22:22:22:22:22:22 | Unmanaged target | Unregistered | ... |
| CCC0001 | Device C | 33.33.33.33 | 33:33:33:33:33:33 | Management target | Unregistered | ... |
| ... | ... | ... | ... | ... | ... | ... |

FIG. 10A

Managed Device List 1000a

| Device ID 1001 | Device name 1002 | IP address 1003 | MAC address 1004 | Registration status 1005 | ... |
|---|---|---|---|---|---|
| AAA0001 | Device A | 11.11.11.11 | 11:11:11:11:11:11 | Registered | ... |
| CCC0001 | Device C | 33.33.33.33 | 33:33:33:33:33:33 | Unregistered | ... |
| ... | ... | ... | ... | ... | ... |

FIG. 10B

Unmanaged Device List 1000b

| Device ID 1001 | Device name 1002 | IP address 1003 | MAC address 1004 | Capability status 1006 | ... |
|---|---|---|---|---|---|
| BBB0001 | Device B | 22.22.22.22 | 22:22:22:22:22:22 | Yes | ... |
| ... | ... | ... | ... | ... | ... |

MONITORING DEVICE, NETWORK DEVICE, CONTROL METHOD OF MONITORING DEVICE, CONTROL METHOD OF NETWORK DEVICE, AND RECORDING MEDIUM

BACKGROUND OF THE INVENTION

Field of the Invention

The present invention relates to device registration in a device management system.

Description of the Related Art

There are device management systems that manage and analyze data collected from devices such as Multifunction Peripheral (MFP). Some device management systems are configured by a monitoring device that collects information regarding device and a management server that manages the information collected by the monitoring device. There is a mechanism in which a monitoring device manages devices by acquiring data from devices through periodic polling, as an example of a mechanism in which the monitoring device manage devices. Additionally, there is also a mechanism in which the devices are managed by the monitoring device that uses a proxy function. In Japanese Patent Application Laid-Open No. 2018-136876, a mechanism for causing a device having a self-monitoring function that enables collecting operation information necessary for service in the device and transmitting the information to a management server to use a proxy function of the monitoring device is disclosed.

In general, when a device having a self-monitoring function is installed at a customer site, an operator who installs the device operates the device and performs an operation for directly registering the device with the management server. However, because direct access from the device to the management server is impossible in customer environments where monitoring devices are used, in other words, in customer environments where devices are prohibited from being individually connected to the external, because the management server cannot be accessed directly from the device, device registration fails, and consequently, it is possible to complete the device registration operation.

SUMMARY OF THE INVENTION

According to the present invention, device registration through a monitoring device is possible even if the device registration processing to a device management service is unsuccessful in a customer environment where the monitoring device is used.

A monitoring device in the present invention is a monitoring device having a proxy function that relays communication between a device management service and a network device comprising a memory storing instructions; and a processor executing the instructions causing the monitoring device to set, to the network device, a proxy setting by using access information to a proxy function of the monitoring device, if an event based on a failure of device registration with the device management service is received from the network device and the network device is a management target of the monitoring device; and transmit device registration instruction regarding the network device to the device management service to which the proxy setting has been set. Additionally, a network device in the present invention is a network device having a function of collecting data of its own device and transmitting the data to a device management service via a network comprising a memory storing instructions; and a processor executing the instructions causing the network device to report an event based on a failure of device registration to the network if the device registration with the device management service fails; perform a proxy setting based on an instruction in response to the event from a monitoring device having a proxy function that relays communication between the device management service and the network device; and, execute processing instructed from the monitoring device by using the proxy function if the proxy setting has been performed.

Further features of the present invention will become apparent from the following description of exemplary embodiments with reference to the attached drawings.

BRIEF DESCRIPTION OF THE DRAWINGS

FIG. 9 is a diagram showing an example of a device management table.

FIGS. 10A and 10B are diagrams showing one example of a device management screen of the monitoring device 102.

DESCRIPTION OF THE EMBODIMENTS

First Embodiment

Figure 1:
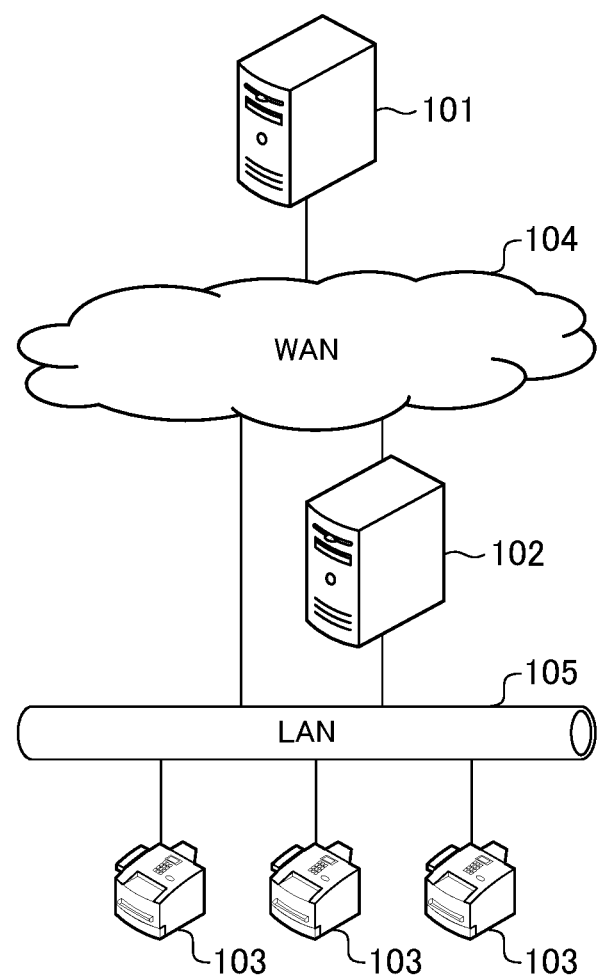
FIG. 1 illustrates the overall system configuration.

FIG. 1 illustrates the overall system configuration. The system of the present embodiment is a device management system for managing network devices. The device management system includes a network device that is a management target, a monitoring device that collects data from the network device, and a device management service that manages the data that the monitoring device has collected. In the present embodiment, although the case in which the network device is an image forming device 103 will be explained as an example, the present invention is not limited thereto. Any devices that can perform communication such as a network device, an image processing device including a scanner, a 3D printer, a laptop, a smartphone, and a smart home appliance may be adopted. Additionally, in the present embodiment, although an example in which a device management service for managing devices is provided by a management server 101 will be described, the present invention is not limited thereto. Device management services may be realized by one or more information processing devices, virtual machines using resources provided by data centers that include information processing devices (cloud services), or a combination thereof.

The management server 101 provides a device management service that centrally manages data of the monitoring device 102 and the image forming device 103. The management server 101 is connected to the monitoring device 102 via a WAN 104. The management server 101 is also connected to the image forming device 103 via the WAN 104 and the LAN 105. Note that a firewall (not illustrated) is provided between the WAN 104 and the monitoring device 102 and between the WAN 104 and the LAN 105. Note that, in the present embodiment, although an example in which the image forming device 103 is a target of the device management service will be explained, the monitoring device 102 may be a target of the device management service, in addition to the image forming device 103.

The monitoring device 102 monitors the image forming device 103 that is a target of the device management service, and acquires various data from the image forming device 103. The monitoring device 102 is connected to the image forming device 103 via the LAN 105 and is connected to the management server 101 via the WAN 104. Even if a firewall is provided between the WAN 104 and the monitoring device 102, the monitoring device 102 can communicate with the management server 101 that provides device management services. The monitoring device 102 has a proxy function and relays communication between the image forming device 103 and the device management service. Note that the monitoring device 102 may be an image forming device that is different from the image forming device 103, having the same function as the image forming device 103 that is a monitoring target of the monitoring device 102.

The image forming device 103 is an image forming device having communication functions such as an Laser Beam Printer (LBP) and MFP and others. The image forming device 103, which is the target of the device management service, is monitored by the monitoring device 102 connected via the LAN 105. The image forming device 103 has a self-monitoring function that detects and collects data used by the device management service in its own device and transmits the date to the device management service. Note that although an example of using the WAN 104 and the LAN 105 as a network has been described in the present embodiment, any communication method can be used if the network is configured to transmit and receive data. For example, the configuration may be any one or a combination of communication networks such as LAN and WAN, cellular networks such as LTE and 5G, wireless networks, telephone lines, dedicated digital lines, and the like.

Figure 2:
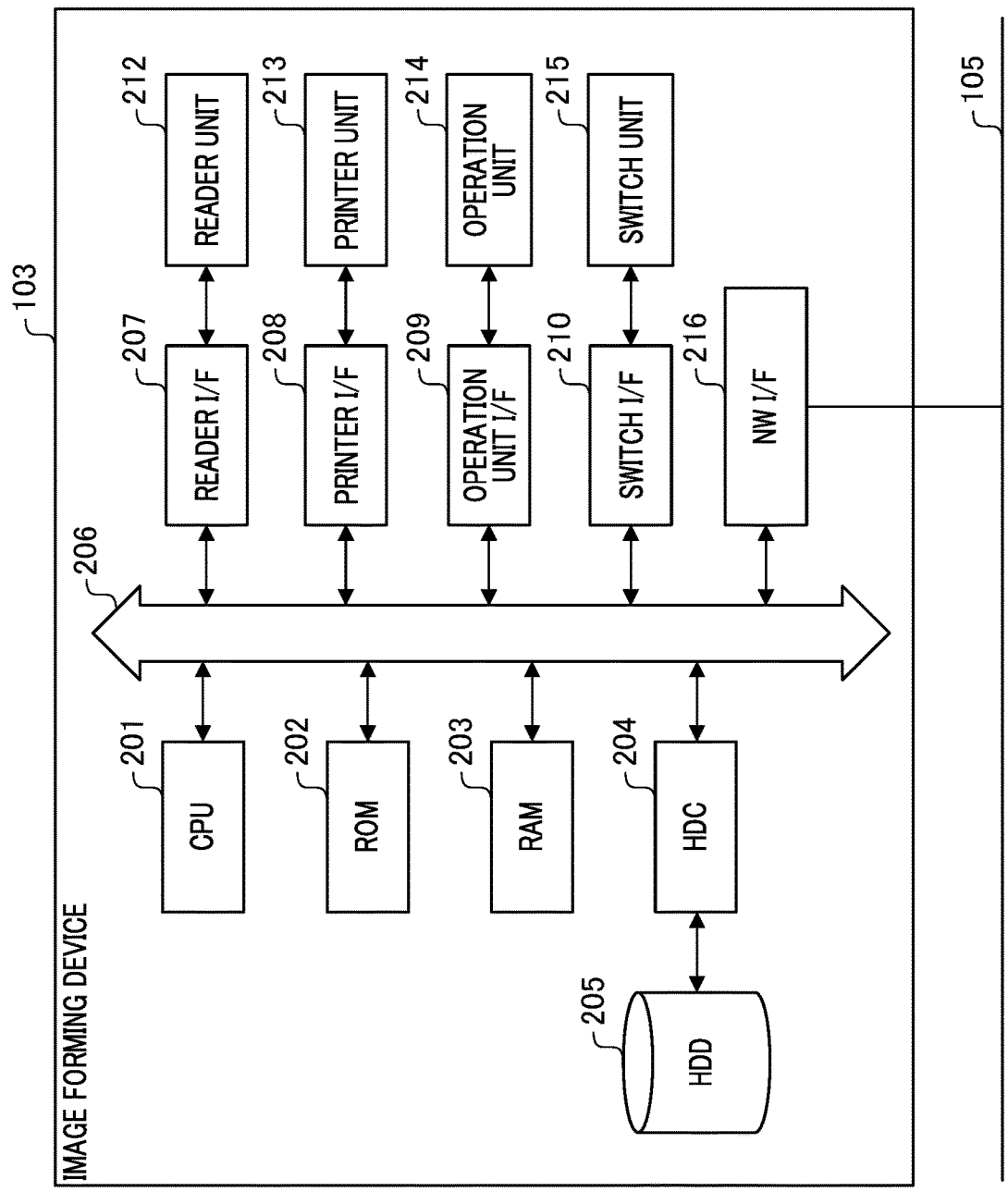
FIG. 2 is a diagram showing an example of the hardware configuration of an image forming device.

FIG. 2 is a diagram showing an example of the hardware configuration of the image forming device 103. The image forming device 103 incudes a CPU 201, a ROM 202, a RAM 203, a HDC 204, an HDD 205, a reader I/F 207, a printer I/F 208, an operation unit I/T 209, a switch I/F 210, and a NW IT 216. The CPU 201, the ROM 202, the RAM 203, the HDC 204, the reader I/F 207, the printer I/F 208, the operation unit I/F 209, the switch I/F 210, and the NW I/F 216 are connected via a system bus 206.

The CPU (Central Processing Unit) 201 integrally controls the entire image forming device 103. The CPU 201 integrally controls each device connected to the system bus 206 by executing software that performs the control of the image forming device 103 stored in the ROM 202 or the HDD 205. The ROM (Read Only Memory) 202 is a memory dedicated to data readout and stores, for example, a basic control program of the image forming device 103. The RAM (Random Access Memory) 203 is a memory that can read and write data. The RAM 203 functions as, for example, a work area for the CPU 201 and the like.

The HDC 204 (Hard Disk Controller) controls the HDD 205. The HDD 205 (Hard Disk Drive) is an example of a storage device and stores various programs, data, and the like. Note that, according to the present embodiment, the example in which the image forming device 103 is provided with the HDD 205 serving as a storage device is explained. However, the present invention is not limited thereto, and another storage device including an SSD or a Disk Drive that loads an external medium may be used.

The reader I/F 207 is an interface that connects a reader unit 212 and the system bus 206 and controls the reader unit 212. The reader unit 212 reads an image as original document and generates image data. The generated image data are used for various processing such as output to a printer unit 213, storage in the HDD 205, or transmission of image data to a host computer connected a network 217 via the network I/F 216, in response to instructions from the user.

The printer I/F 208 is an interface that connects the printer unit 213 and the system bus 206 and controls the printer unit 213. The printer unit 213 prints, on the recording medium (for example, on paper), the original that the reader unit 212 has read and the image data that has been stored in the HDD 205. Additionally, the printer unit 213 receives a print job from a host computer that is connected to the network 217 via the network I/F unit 216 and prints image data based on the print job.

The operation unit I/F 209 is an interface that connects an operation unit 214 and the system bus 206 and controls the operation unit 214. The operation unit I/F 209 controls the display on the operation unit 214 and the user input from the operation unit. The operation unit 214 performs display for the user and reception of operations from the user. The operation unit 214 may be configured by, for example, display and a button for operation, or it may be configured by, for example, a touch panel. The GUI can be configured as if the user can directly operate the screen displayed on the touch panel by associating input coordinates and display coordinates on the touch panel.

The switch I/F 210 is an interface that connects a switch unit 215 and the system bus 206 and controls the switch unit 215. The switch unit 215 has a switch and the like for operating the power ON/OFF state of the image forming device 103. The NW (Network) I/F 216 is a communication interface that connects the image forming device 103 and the network (LAN 105). The CPU 201 communicates with other information devices on the network via the NW I/F 216 and the network.

Figure 3:
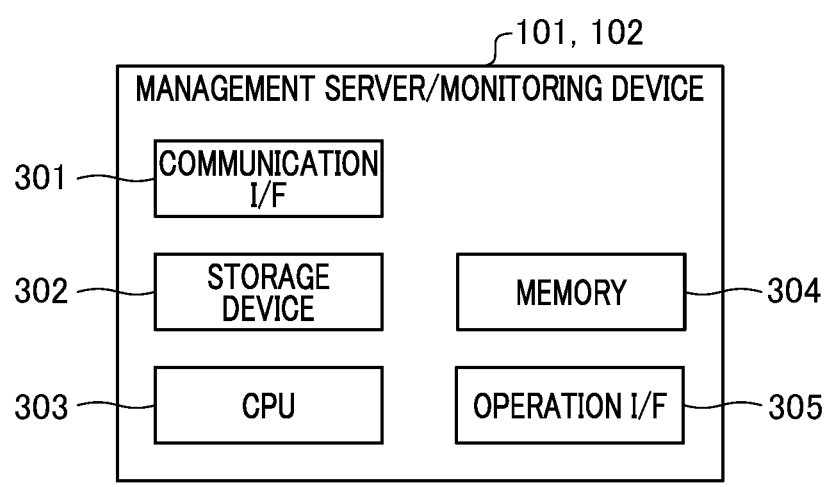
FIG. 3 is a diagram showing an example of the hardware configuration of a monitoring device and a management server.

FIG. 3 is a diagram showing an example of the hardware configuration of the monitoring device 102 and the management server 101. The monitoring device 102 and the management server 101 each has a hardware configuration similar to that of a general information processing device, and includes a CPU 303, and a memory 304, a storage device 302, an operation I/F 305, and a communication I/F 301.

The CPU 303 of the monitoring device 102 controls the monitoring device 102 and the CPU 303 of the management server 101 controls the management server 101. The CPU 303 realizes various types of control by loading programs from the storage device 302 into the memory 304 and executing the programs. The storage device 302 stores an OS (Operating System), the programs, management data, data that has been collected from an external system or a device, and the like. The memory 304 functions as a work area for the CPU 303 and the like. The operation I/F 305 outputs execution results of various data and programs to an output device, for example, a connected display, or receives an input from an input device that is connected. The communication I/F 301 is a network interface for performing communication with an external system and an external device. The communication I/F 301 of the monitoring device 102 is connected to, for example, the WAN 104 and the LAN 105. The communication I/F 301 of the management server 101 is connected to, for example, the WAN 104.

Figure 4:
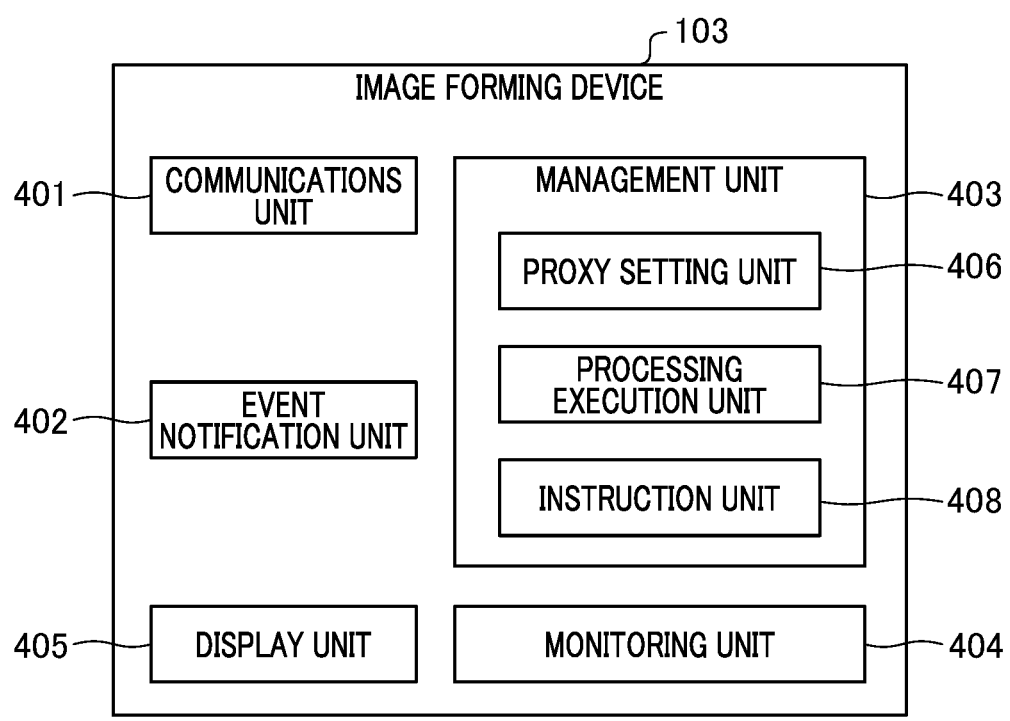
FIG. 4 is a diagram showing an example of the software configuration of the image forming device.

FIG. 4 is a diagram showing an example of the software configuration (functional configuration) of the image forming device 103. The image forming device 103 has a communication unit 401, an event notification unit 402, a management unit 403, a monitoring unit 404, and a display unit 405. The communication unit 401 performs communication with external devices such as the management server 101, a monitoring device 102 and the like. The event notification unit 402 reports an event to the external device. For example, when the registration processing to the management server 101 is unsuccessful, the event notification unit 402 performs event notification for searching the monitoring device 102 that is present in the same network by multicast communication. The management unit 403 performs management of data in the image forming device 103 and necessary processing. The management unit 403 has a proxy setting unit 406, a processing execution unit 407, and an instruction unit 408. The proxy setting unit 406 manages a proxy setting for using the proxy function of the monitoring device 102. The processing execution unit 407 executes the processing that has been instructed by the monitoring device 102 or the management server 101. The instruction unit 408 performs instructions including continuation or discontinuation of the processing to the monitoring device 102. The monitoring unit 404 performs the monitoring processing for monitoring the operation status of the image forming device 103 that has a self-monitoring function and the occurrence of event such as an error. The monitoring unit 404 performs the monitoring processing, for example, when the registration processing is successful. The display unit 405 controls the display on the display device that the control unit 214 has.

Figure 5:
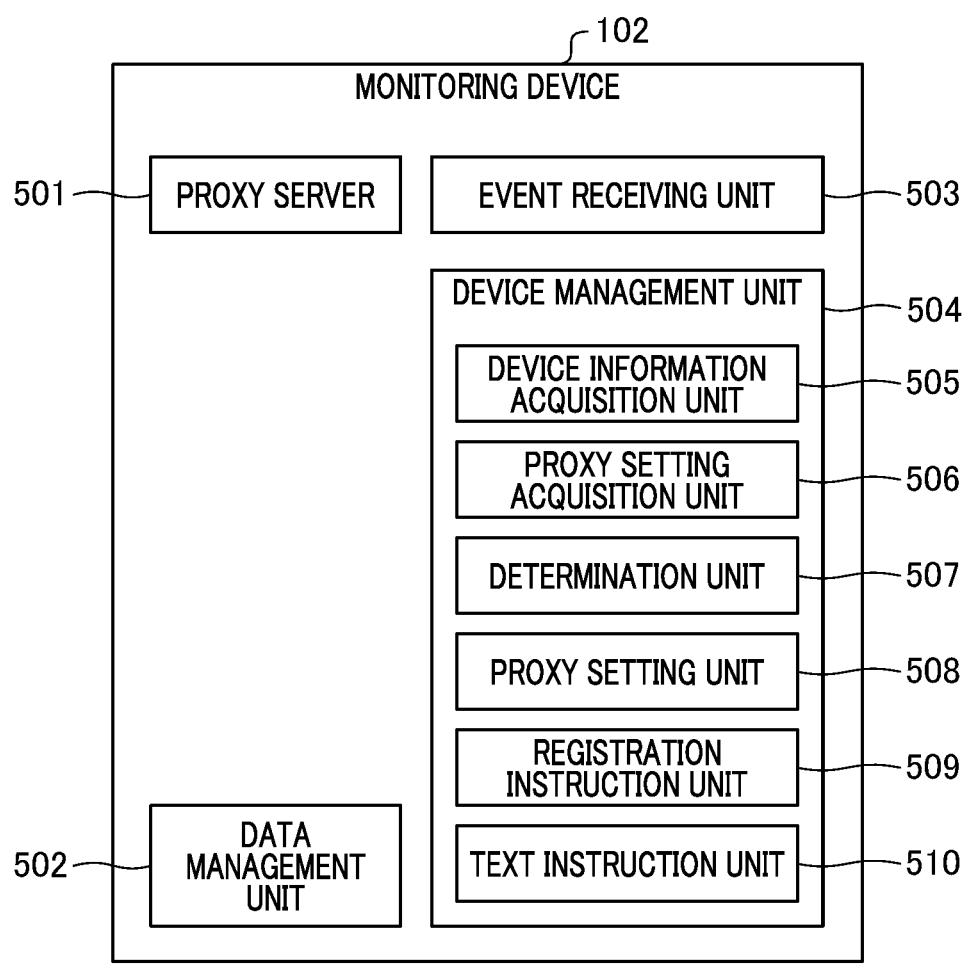
FIG. 5 is a diagram showing an example of the software configuration of the monitoring device.

FIG. 5 is a diagram showing an example of the software configuration (functional configuration) of the monitoring device 102. The monitoring device 102 has a proxy server 501, a data management unit 502, an event receiving unit 503, and a device management unit 504. The proxy server 501 aggregates communications from the image forming device 103 that has a self-monitoring function and relays communication between the image forming device 103 and the device management service. The data management unit 502 manages the device information that is necessary for monitoring devices. For example, the data management unit 502 manages status information indicating whether or not the device is a management target of itself. The event receiving unit 503 receives an event reported from the image forming device 103.

The device management unit 504 performs the setting of proxy server information that itself has, registration instructions, and the like to the image forming device 103 that has a self-monitoring function. The device management unit 504 has a device information acquisition unit 505, a proxy setting acquisition unit 506, a determination unit 507, a proxy setting unit 508, a registration instruction unit 509, and a test instruction unit 510. The device information acquisition unit 505 acquires device information such as a serial number from the image forming device 103. The proxy setting acquisition unit 506 acquires information regarding the proxy setting from the image forming device 103. The determination unit 507 determines whether or not the image forming device 103 is a management target of the device management service, whether or not the image forming device 103 is a device that is a target device that needs to utilize the proxy function of the monitoring device 102 itself, and the like. The proxy setting unit 508 performs the proxy setting in which access information to the proxy function is used so that the proxy server 501 is used by the image forming apparatus 103. The registration instruction unit 509 performs the processing for registering the image forming device 103 that is to use the proxy server 501 with the device management service. The test instruction unit 510 instructs the image forming device 103 in which the registration with the device management service has failed at the current point in time to perform a communication test with the device management service in which the proxy server 501 is used.

Figure 6:
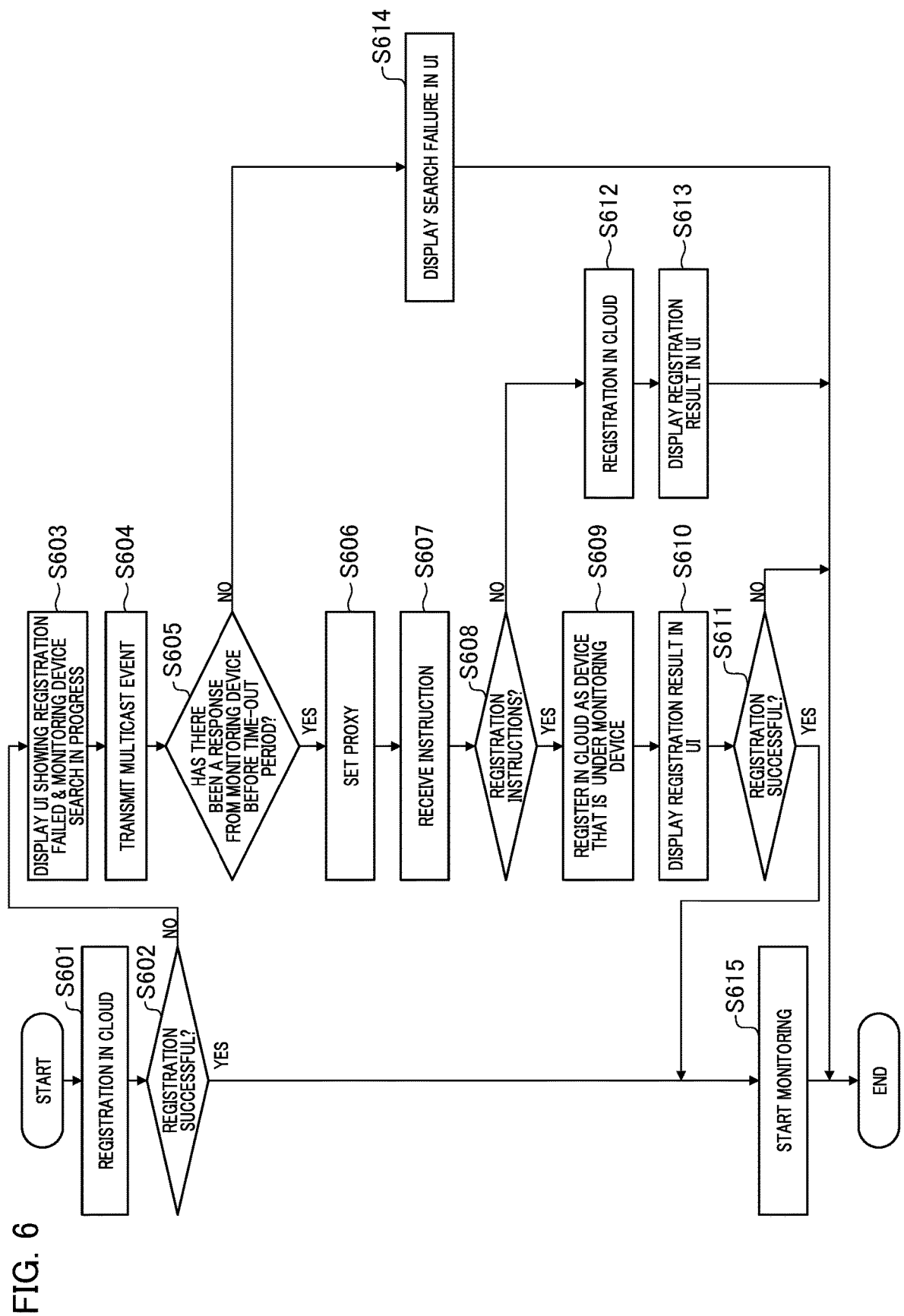
FIG. 6 is a flowchart showing an example of the device registration processing for the image forming device.

FIG. 6 is a flowchart showing an example of the device registration processing performed by the image forming device 103 in the first embodiment. Each of the processes shown in the flowchart in FIG. 6 is realized by the CPU 201 of the image forming device 103 reading out the control program stored in the ROM 202 or the HDD 205 into the RAM 203 and executing the program. FIGS. 7A to 7D are diagrams showing an example of the processing result display screen of the image forming device 103 in the first embodiment.

In S601, the communication unit 401 sends an instruction for performing the device registration processing for registering the image forming device 103 as a management target of the device management service to the management server 101 that provides the device management service. For example, when the communication unit 401 receives a registration instruction together with an input of a first device registration key from a person who has installed the device via a UI screen of the image forming device 103, it transmits the instruction for device registration together with the first device registration key to the management server 101. The first device registration key is a registration key for enabling temporary registration with the management server 101, instead of a registration key for linking the management server 101 and the image forming device 103. The first device registration key may be, for example, an ID associated with a customer or an ID associated with an upstream organization for the customer (for example, a sales company that manages the customer). On the management server 101 side, authentication is performed by using the first device registration key, and when the authentication is successful, credential information for issuing a token necessary for future communication is returned to the image forming device 103.

In S602, the management unit 403 determines whether or not device registration processing in the management server 101 is successful. For example, when the management unit 403 receives a response regarding the credential information from the management server 101, it determines that the device registration processing is successful. When the management unit 403 determines that the device registration processing is successful, the process proceeds to S615. In contrast, if the management unit 403 determines that the device registration processing is not successful, the process proceeds to S603.

When the device registration processing in the management server 10 is successful, in S615, the monitoring unit 404 starts the monitoring processing for its own device. Note that, after start of the monitoring processing, the communication unit 401 transmits the information regarding the image forming device 103 that is monitored by the monitoring unit 404 to the management server 101. The communication unit 401 requests the management server 101 to issue a token, together with the credential information returned in S601, and assigns the information regarding the issued token to the information to be transmitted to the management server 101.

Figure 7A:
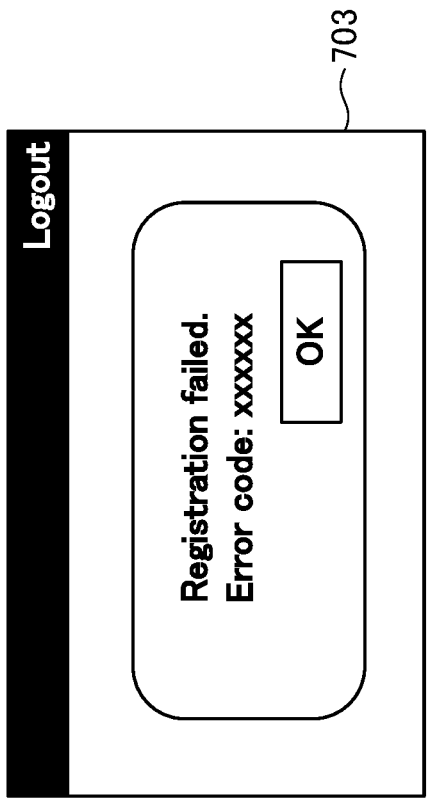
FIGS. 7A to 7D are diagrams showing an example of display of a processing result of the image forming device.

When the device registration processing in the management server 10 is unsuccessful, in S603, the management unit 403 informs the user that the registration processing is unsuccessful and that the search for the monitoring device 102 is in-progress. For example, the management unit 403 displays a message on the UI screen of the operation unit 214 that the registration processing is unsuccessful, and the search for the monitoring device 102 is in-progress. FIG. 7A is a diagram showing an example of the UI screen displayed in S603. A search-in-progress screen 701 is a screen showing that device registration processing to the management server 101 is unsuccessful and the search for the monitoring device 102 is in progress.

Figure 7B:
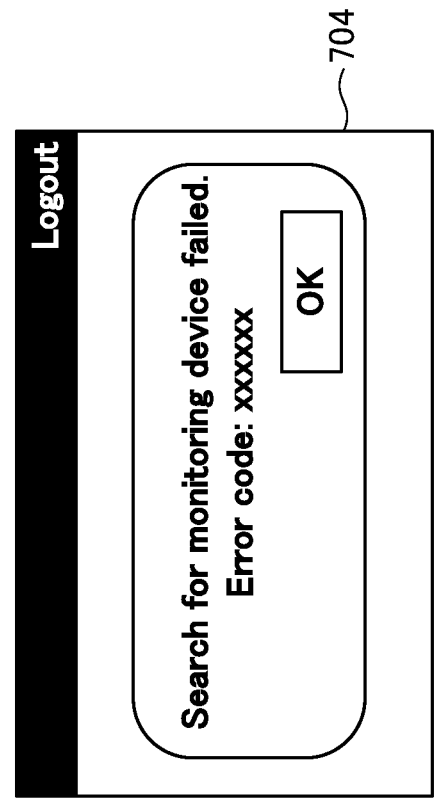
Figure 7C:
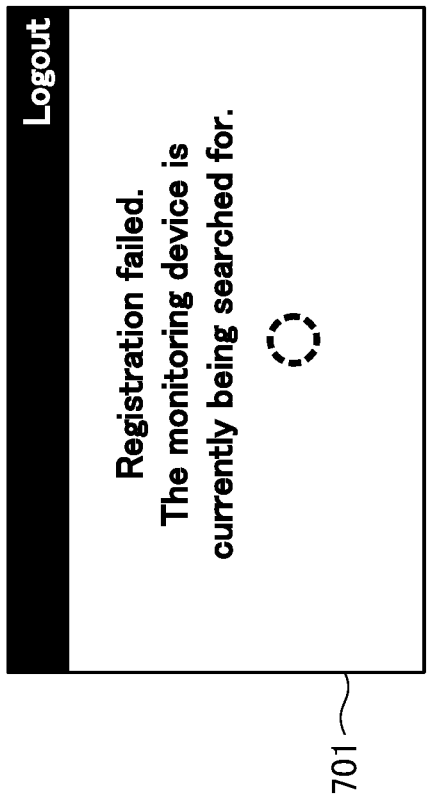
Figure 7D:
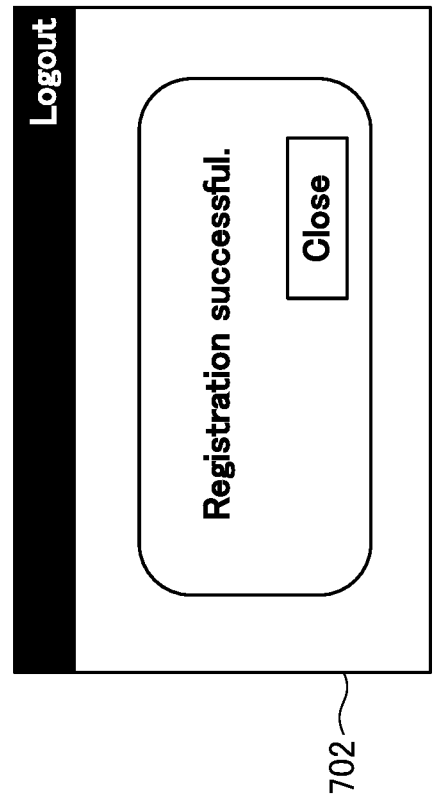

In S604, the event notification unit 402 provides a notification regarding an event based on the failure of the device registration processing to the device management service to the monitoring device 102 via multicast communication. In S605, the communication unit 401 waits for a request from the monitoring device 102 that is a response to the search event in S604 until the default timeout period. When the communication unit 401 receives a request from the monitoring device 102, the process proceeds to S606. In contrast, when the communication unit 401 does not receive a request from the monitoring device 102, the process proceeds to S614. In S614, the management unit 403 displays a message indicating that the search is unsuccessful on the UI screen of the operation unit 214. FIG. 7D is a diagram showing an example of the UI screen when the search of the monitoring device 102 is unsuccessful. A search failure screen 704 indicates that the search of a monitoring device is unsuccessful.

In S606, the management unit 403 stores the proxy setting information included in the request that has been received from the monitoring device 102. In S607, the communication unit 401 receives an instruction from the monitoring device 102. In S608, the management unit 403 determines whether or not the content of instruction that has been received from the monitoring device 102 is the registration processing. When the content of instruction is the registration processing, the process proceeds to S609. In contrast, when the content of instruction is a communication test instruction, the process proceeds to S612.

When the content of instruction received from the monitoring device 102 is the registration processing, in S609, the communication unit 401 performs the device registration processing for registering the image forming device 103 as a management target of the device management service with the management server 101 that provides the device management service. The device registration processing is performed via the proxy server 501 of the monitoring device 102. Specifically, the monitoring device 102 performs the device registration processing with the device management service, instead of the image forming device 103. During the instruction of device registration to the management server 101 via the proxy server 501 of the monitoring device 102, the communication unit 401 performs the device registration processing by using a second device registration key that has been reported from the monitoring device 102. The details of the second device registration key will be described below in the explanation regarding FIG. 8.

In S610, the management unit 403 displays the result of the device registration processing in S609 on the UI screen of the operation unit 214. FIG. 7B is a diagram showing an example of the UI screen when the registration processing on the management server 101 is successful. A success screen 702 indicates that the device registration processing on the management server 101 is successful. In S611, the management unit 403 determines whether or not the device registration processing is successful. When the device registration processing is successful, the process proceeds to S615. In contrast, if the device registration processing is unsuccessful, the process ends.

When the content of instruction received from the monitoring device 102 is a communication test instruction, in S612, the communication unit 401 performs the device registration processing on the management server 101 by using the first device registration key via the proxy server 501 of the monitoring device 102. In S613, the management unit 403 displays the results of the device registration processing in S612 on the UI screen. FIG. 7C is a diagram showing an example of the UI screen when the registration processing on the management server 101 is unsuccessful. A registration failure screen 703 indicates that the device registration processing on the management server 101 is unsuccessful.

Figure 8:
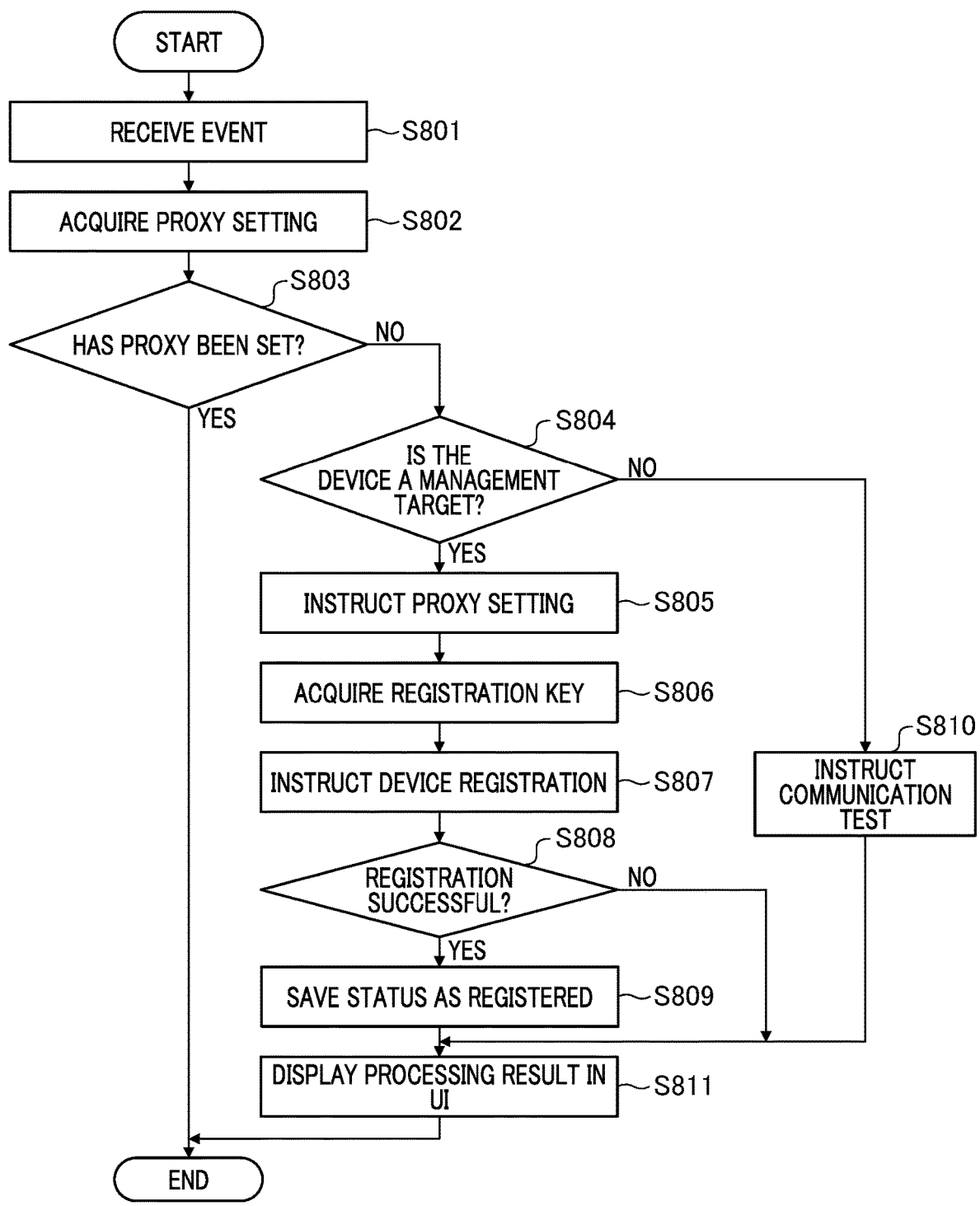
FIG. 8 is a flowchart showing an example of the device registration processing for the monitoring device.

FIG. 8 is a flowchart showing an example of the device registration processing performed by the monitoring device 102 in the first embodiment. Each process shown in the flowchart in FIG. 8 is realized by the CPU 303 of the monitoring device 102 reading out the control program stored in the storage device 302 into the memory 304 and executing the program.

In S801, the event receiving unit 503 receives an event from the image forming device 103. In this case, the event that the event receiving unit 503 receives is the event that the event notification unit 402 of the image forming device 103 has reported by multicast communication in S604. In S802, the device management unit 504 acquires device information such as proxy setting and device identifiers (serial numbers) from the image forming device 103 that has transmitted the event received in S801.

In S803 and S804 the device management unit 504 determines whether or not the image forming device 103 is a device to be monitored by the monitoring device 102. First, in S803, the device management unit 504 determines whether or not the image forming device 103 is a device that can be a target to be monitored by the monitoring device 102 based on the proxy setting. Specifically, the device management unit 504 determines whether or not the image forming device 103 is a device to be monitored by the monitoring device 102 by determining whether or not the proxy setting of the image forming device 103 acquired in S802 is empty. When the device management unit 504 determines that the proxy setting of the image forming device 103 is empty, the process proceeds to S804. In contrast, when the device management unit 504 determines that the proxy setting of the image forming device 103 is not empty, this process ends. This is because, when the proxy setting is not empty, it is assumed that the image forming device 103 has already been monitored by another monitoring device. Note that, in S803, a configuration in which the device management unit 504 determines whether or not the proxy information of the proxy server 501 is set to the proxy setting of the image forming device 103 may be adopted. In this case, when the proxy information of the proxy server 501 is not set in the proxy setting of imaging device 103, the process proceeds to S804. In contrast, if the proxy information of the proxy server 501 has been set, this process ends.

Next, in S804, the device management unit 504 determines whether or not the image forming device 103 is treated as a management target device of the monitoring device 102. The device management unit 504 determines whether or not the image forming device 103 has already been set as a management target device of the monitoring device 102, based on the device information acquired from the image forming device 103 in S802 and the device management information that the data management unit 502 holds. When the device management unit 504 determines that the image forming device 103 has already been set as a management target device, the process proceeds to S805. In contrast, when the device management unit 504 determines that the image forming device 103 is a device excluded from management target, the process proceeds to S810.

A description will now be given of the device management information that the monitoring device 102 holds. The device management information is various types of information regarding devices that are managed for performing the monitoring of devices that are targets of the device management service, and the device management information is generated by the management server 101. The monitoring device 102 periodically acquires device management information from the management server 101 that periodically provides device management services. FIG. 9 shows an example of a device management table in which that device management information is managed. For example, a device ID 901, a device name 902, an IP address 903, a MAC address 904, a management status 905, and a registration status 906 are included in the device management table. The device management information is not limited to these.

The device ID 901 is information for identifying the device. The device name 902 is the name of device. The IP address 903 is information regarding the IP address set for the device. The MAC address 904 is information regarding the MAC address set for the device. The management status 905 is information indicating whether or not the device is a management target. The registration status 906 is information indicating whether or not the device has already been registered as a management target device of the device management service in the management server 101.

The management status 905 may or may not be included in the device management information that has been acquired from the management server 101. When the information regarding the management status 905 is not included in the device management information that has been acquired from the management server 101, the monitoring device 102 sets the management status 905 of, for example, a device that is present in the information acquired from the management server 101 to be a management target. In contrast, a device that is not present in the information that has been acquired from the management server 101, in other words, a device resulting from the only search performed on the monitoring device 102 makes the management status 905 as an "unmanaged" target.

Note that, in the present embodiment, an example has been explained in which, in the monitoring device 102, whether or not the device that has reported the event in S804 is a management target is determined based on the device management information that has been periodically acquired from the management server 101 and stored in advance in the monitoring device 102. However, there is a probability that the device management information that has been periodically acquired from the management server 101 and stored in the monitoring device 102 is not the most recent information. Accordingly, when determining whether or not the device is a management target device, information of the latest management target device may be acquired from the management server 101.

The description will return to FIG. 8. In S805, the device management unit 504 provides proxy information of the proxy server 501 to the image forming device 103. Thus, the device management unit 504 performs the proxy setting using access information to its own proxy function to the image forming device 103. Note that, in the present embodiment, although an example has been described in which, in S804, whether or not the image forming device 103 is a management target device is determined, and, in S805, an instruction for the proxy setting is performed only when the image forming device 103 is a management target, the order of the processes in S804 and S805 may be reversed.

In S806, the device management unit 504 acquires the second device registration key from the management server 101. The second device registration key is a device registration key that links the monitoring device 102 and the imaging device 103. In S807, the device management section 504 instructs the device registration processing for registering the image forming device 103, which is to caused to use its own proxy function, with the device management service. Specifically, first, the device management unit 504 assigns the second device registration key to the image forming device 103 and performs the device registration instruction to the device management service. The image forming device 103 that has received the device registration instruction performs the device registration instruction of the image forming device 103 to the device management service of the management server 101 via the proxy function of the monitoring device 102. The monitoring device 102 that has received the instruction for the device registration processing in which the proxy server 501 is used from the image forming device 103 provides the instruction for the device registration processing performed by the image forming device 103 to the device management service.

In S808, the device management unit 504 determines whether or not the registration processing in S807 is successful. When it determines the registration processing is successful, the process proceeds to S809. In contrast, when it determines the registration processing is not successful, the process proceeds to S811. In S809, the data management unit 502 updates the registration status 906 of the device management information (device management table, FIG. 9) to "Registered.".

In S810, the device management unit 504 instructs the image forming device 103 to conduct a communication test with the device management service through the proxy function of the monitoring device 102. If the proxy setting for causing the image forming device 103 to use the proxy server 501 has not been set, the device management unit 504 provides an instruction for the communication test after the proxy setting has been set. It is possible to promptly perform the device registration processing for the image forming device 103 in which the communication test is successful, in the case where the device management service in which the image forming device 103 is treated as a management target by performing the communication test and confirming a communication status. In S811, the device management unit 504 displays a processing result according to the success or failure of the device registration determined in S808 on the UI screen of the operation unit via the operation I/F 305.

FIGS. 10A and 10B are diagrams showing an example of a device management screen of the monitoring device 102 in the present embodiment. FIG. 10A is a diagram showing an example of a management target device list screen. On a management target device list screen 1000a, device information of devices that are management targets by the device management service, in other words, devices in which the management status 905 is "Managed" is displayed. On the managed device list screen 1000a, for example, a device ID 1001, a device name 1002, an IP address 1003, MAC address 1004, and a registration status 1005 are displayed. The device ID 1001 to the registration status 1005 are, respectively, items of information corresponding to the device ID 901 to the MAC address 904, and the registration status 906. A person who has installed a device or a user can confirm the result of the device registration instruction to the device management service by referring to the registration status 1005.

FIG. 10B is a diagram showing an example of an unmanaged device list screen. On an unmanaged device list screen 1000b, device information of devices that are excluded from management of the device management service, in other words, devices in which the management status 905 is "Unmanaged" is displayed. On the unmanaged device list screen 1000b, for example, the device ID 1001, the device name 1002, the IP address 1003, the MAC address 1004, and a capability status 1006 are displayed. The device ID 1001 to the MAC address 1004 are respectively items of information corresponding to the device ID 901 to the MAC address 904. The capability status 1006 displays information indicating whether or not the device has been registered with the management server 101. A person who has installed the device or a user can confirm the result of communication test instructions that have been performed on the device, by referring to the capability status 1006.

Note that the attributes and methods displayed on the device management screen are not limited to these. Additionally, a detailed information screen of the device may be output by clicking a cell of any of the above attribute information so that the detailed information of each of processing results (For example, detailed information of an error when the processing is unsuccessful, and the like) is displayed.

Thus, it is possible to perform the device registration processing on the device management service via the monitoring device by reporting an event to the monitoring device that has a proxy function from devices even if the device registration operation performed by the person who has installed the device is unsuccessful. Consequently, the success of the device registration processing is possible in a customer environment where the monitoring device is used.

Second Embodiment

In the first example, the example has been described in which the image forming device 103 performs processing according to an instruction received from the monitoring device 102 in the case in which a single monitoring device 102 corresponding to the image forming device 103 is present. However, when a plurality of monitoring devices is present, the image forming device 103 needs not executing the instructions that have been received from all the monitoring devices. For example, when an instruction is received from a monitoring device that treats the image forming device 103 as a management target, there is a need to execute only the instruction received from the monitoring device and there is no need to execute the instruction provided from the monitoring device that treats the image forming devices 103 as unmanaged. There is a probability that a load is temporarily applied to the device due to unnecessary processing based on the instruction received from the monitoring device that treats the image forming device 103 as unmanaged. Therefore, in the second embodiment, a mechanism for appropriately executing the processing in the case in which a plurality of monitoring devices is present will be explained. Only the difference from the first example will be explained below.

Figure 11:
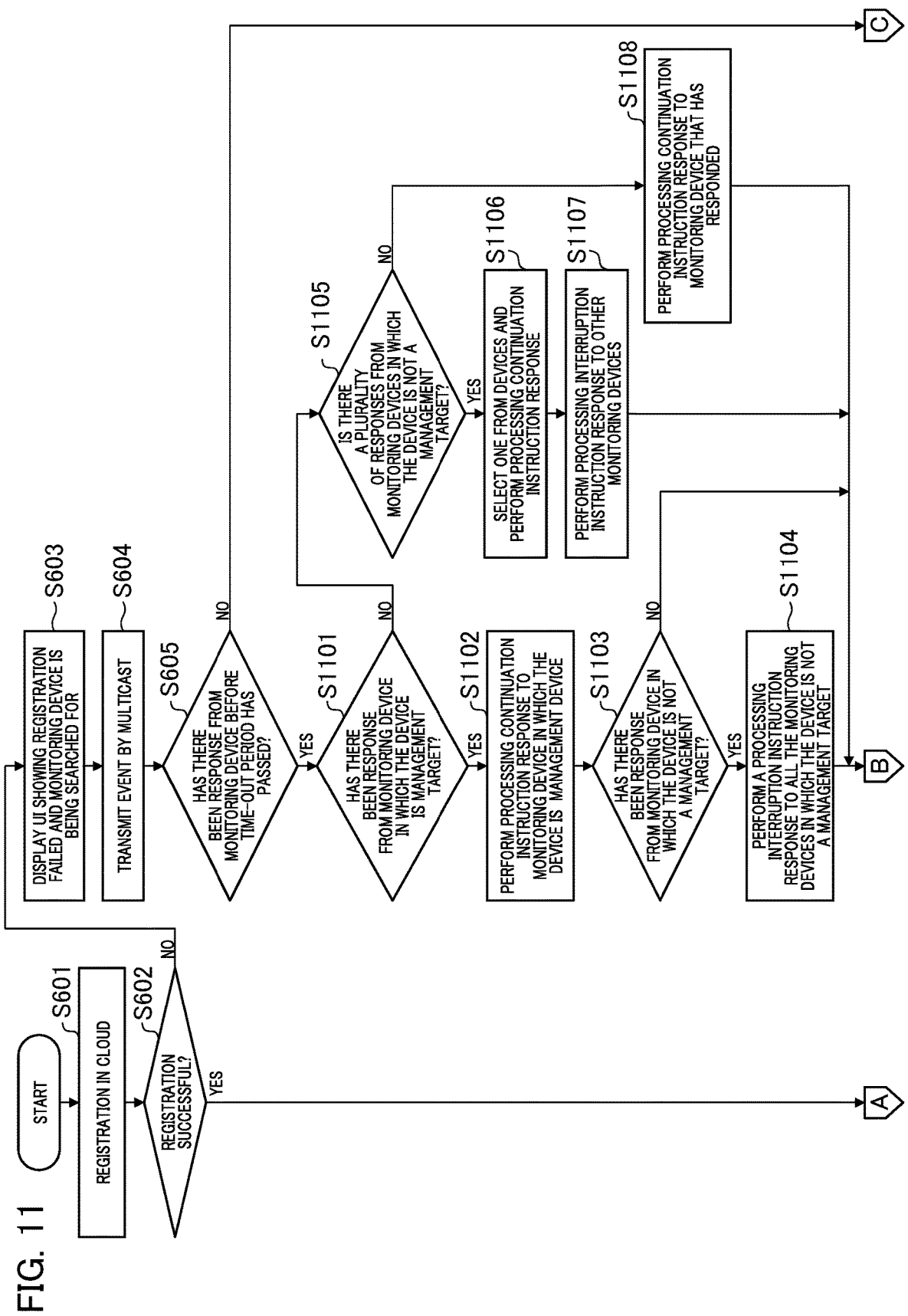
FIG. 11 is a flowchart showing an example of the device registration processing performed by the image forming device in the second embodiment.
Figure 12:
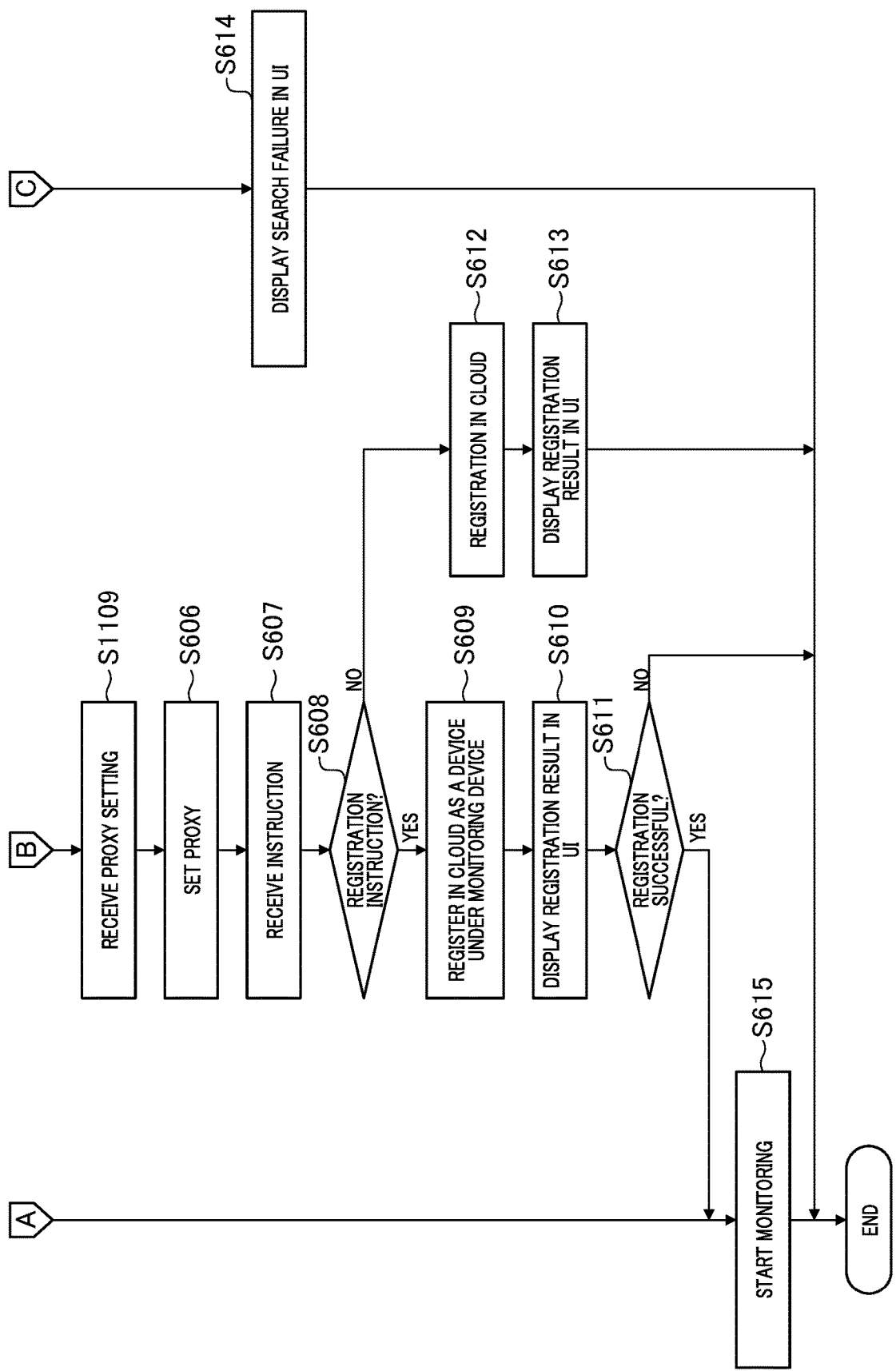
FIG. 12 is a flowchart showing an example of the device registration processing performed by the image forming device in the second embodiment.

FIG. 11 and FIG. 12 are flowcharts showing an example of the device registration processing performed by the image forming device 103 in the second embodiment. Note that the same symbols are appended to the processes that are the same as those in the first embodiment (FIG. 6) and the explanation thereof will be omitted. Each of the processes shown in the flowcharts in FIG. 11 and FIG. 12 is realized by the CPU 201 of the image forming device 103 reading out control programs stored in the ROM 202 or the HDD 205 into the RAM 203 and executing the programs. When the image forming device 103 sends an event based on the failure of device registration to the device management service by multicast and receives a response (request) to the event from the monitoring device, the process of S1101 is performed. The response (request) to the event may be received from a plurality of monitoring devices.

In S1101, the management unit 403 determines whether or not there is a monitoring device that treats the image forming device 103 as a management target among the monitoring devices that have sent the request received in S605. The management unit 403 determines whether or not the monitoring device that treats the image forming device 103 as a management target is present based on the information included in the request. If it is determined that the monitoring device that treats the image forming device 103 as a management target is present at the transmission source of the request, the process proceeds to S1102. In contrast, if it is determined that a monitoring device that treats the image forming device 103 as a management target is not present at the transmission source of the request, the process proceeds to S1105.

In S1102, the communication unit 401 sends a processing continuation instruction as a response to the monitoring device in which itself (the image forming device 103) is a management target. In S1103, the management unit 403 determines whether or not the monitoring device that treats the image forming device 103 itself as unmanaged is present among the monitoring devices that have transmitted the request received in S605. If the monitoring device that treats the image forming device 103 as unmanaged is present at the transmission source of the request, the process proceeds to S1104. In contrast, if the monitoring device that treats the image forming device 103 as unmanaged is not present at the transmission source of the request, the process proceeds to S1109. In S1104, the communication unit 401 sends a processing interruption instruction as a response to all the monitoring devices that treat the image forming device 103 as unmanaged.

When the monitoring device that treats the image forming device 103 as a management target is not present at the transmission source of the request, the management unit 403 determines, in S1105, whether or not a plurality of monitoring devices that treats the image forming device 103 as unmanaged is present at the transmission source of the request. When a plurality of monitoring devices that treats the image forming device 103 as unmanaged is present at the transmission source of the request, that is, when a plurality of requests from the monitoring device that treats the image forming device 103 as unmanaged is present, the process proceeds to S1106. In contrast, when a plurality of monitoring devices that treats the image forming device 103 as unmanaged is not present at the transmission source of the request, the process proceeds to S1108.

In S1106, the communication unit 401 selects one of the monitoring devices that treat the image forming device 103 as unmanaged at the transmission source of the request, and sends the processing continuation instruction as a response. In S1107, the communication unit 401 sends the processing interruption instruction as a response to the monitoring device at the transmission source of all the remaining requests that are not selected in S1106.

If there is only one monitoring device that treats the image forming device 103 as unmanaged at the transmission source of the request, in S1108, the communication unit 401 sends the processing continuation instruction as a response to the monitoring device at the transmission source of the request. In S1109, the communication unit 401 receives the proxy setting from the monitoring device that has sent the processing continuation instruction. Subsequently, the process proceeds to S606, where the management unit 403 performs the proxy setting based on the proxy setting received in S1109.

By the above processing, when a plurality of monitoring devices present, it is possible to use only the proxy function of the monitoring device that has the device as a management target and reduce the processing of the monitoring device that does not have the device as a management target. Additionally, even when there is only a monitoring device that treats the device as unmanaged, it is possible to realize both using the proxy function in the device and reducing the processing of other monitoring devices by receiving the proxy setting of any one of the monitoring devices and completing the processing with other monitoring devices.

Figure 13:
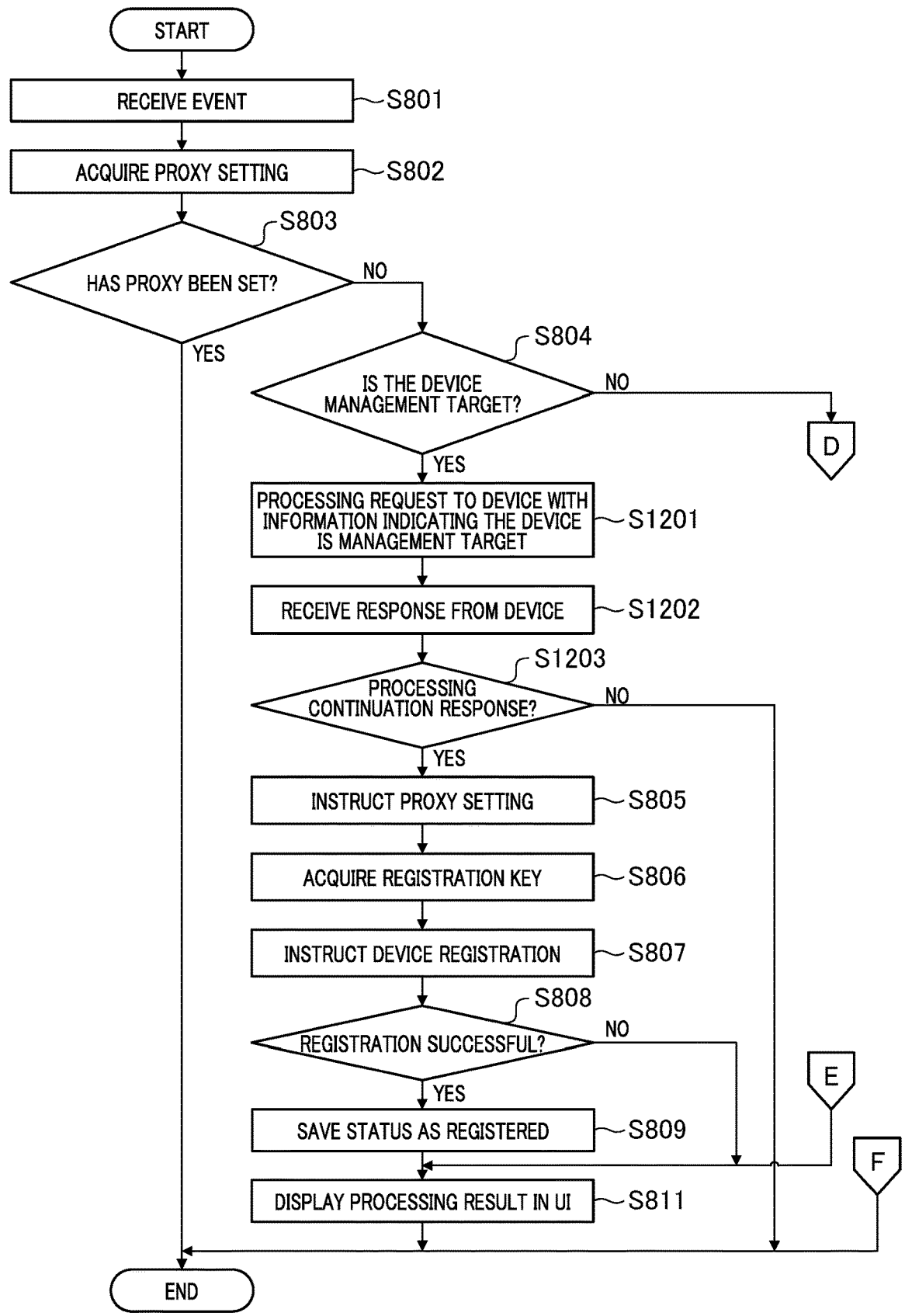
FIG. 13 is a flowchart showing an example of the device registration processing performed by the monitoring device in the second embodiment.
Figure 14:
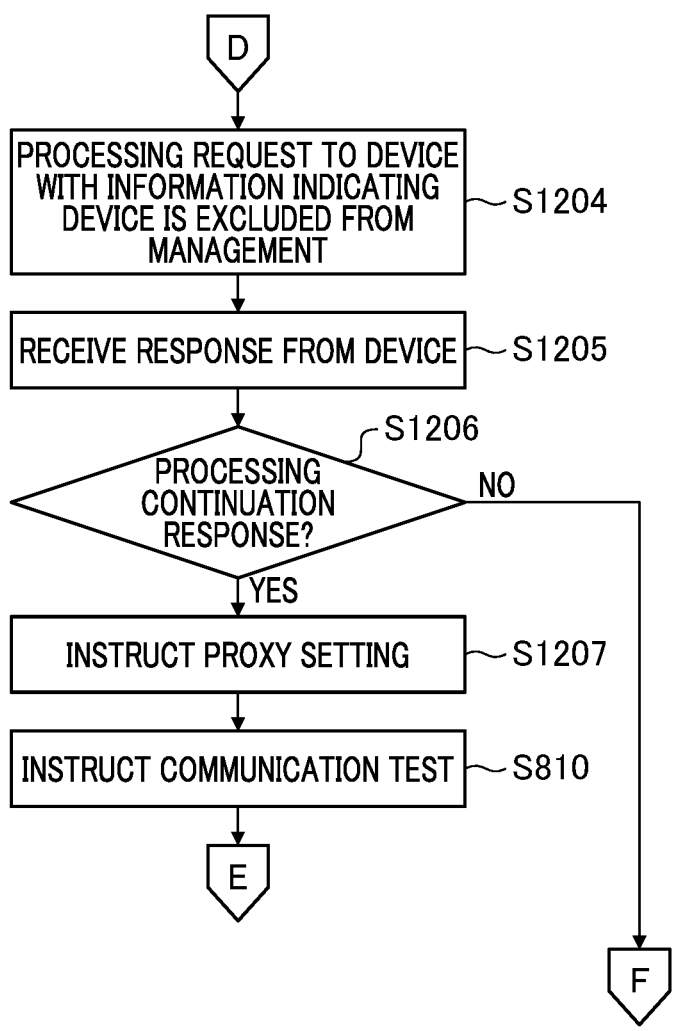
FIG. 14 is a flowchart showing an example of the device registration processing performed by the monitoring device in the second embodiment.

FIG. 13 and FIG. 14 are flowcharts showing an example of the device registration processing performed by the monitoring device 102 in the second embodiment. Note that the same symbols are appended to the processes that are the same as those in the first embodiment (FIG. 8), and the explanation thereof will be omitted. Each of the processes shown in the flowcharts of FIG. 13 and FIG. 14 is realized by the CPU 303 of the monitoring device 102 reading out a control program stored in the storage device 302 into the memory 304 and executing the program.

If it is determined in S803 and S804 that the image forming device 103 that is the transmission source of the event based on the failure of the device registration with the device management service is a management target of the monitoring device 102, the process in S1201 is performed. In S1201, the device management unit 504 performs a processing request to the image forming device 103 that is the transmission source of the event, together with the information indicating that the image forming device 103 is a management target of the monitoring device 102, as a response to the event.

In S1202, the device management unit 504 receives a response from the image forming device 103 in response to the response in S1201. In S1203, the device management unit 504 determines whether or not the response from the image forming device 103 is a processing continuation instruction. When the response from the image forming device 103 is determined to be a processing continuation instruction, the process proceeds to S805. In S805, the device management unit 504 provides proxy setting instructions to the image forming device 103. In contrast, when the response from the image forming device 103 is determined to be a processing stop instruction, the process ends.

When the image forming device 103 that is the transmission source of the event is excluded from management, in S1204, the device management unit 504 performs a processing request together with the information indicating that the image forming device 103 is excluded from management as a response to the event. In S1205, the device management unit 504 receives a response from the image forming device 103 in response to the response in S1204.

In S1206, the device management unit 504 determines whether or not the response from the image forming device 103 is the processing continuation instruction. When the response from the image forming device 103 is the processing continuation instruction, the process proceeds to S1207. If the response from the image forming device 103 is the processing interruption instruction, this processing ends. In S1207, the device management unit 504 performs the proxy setting instructions to the image forming device 103.

Thus, when the image forming device 103 is a management target and, in S1202, the processing continuation instruction is received from the image forming device 103, the proxy setting is performed to the image forming device 103 and the processing for registering the image forming device 103 with the device management service is performed. When the image forming device 103 is a management target, and, in S1205, the processing continuation instruction is received from the image forming device 103, the proxy setting is performed to the image forming device 103. In contrast, when the processing stop instruction is received from the image forming device 103, the processing ends and the proxy setting for the image forming device 103 is not performed. It is possible to avoid unnecessary processing by selecting a monitoring device that performs the processing on the device side based on the information indicating whether or not the device is a management target, which has been reported from the monitoring device, in an environment where a plurality of monitoring devices is present, by the above processing.

Thus, according to the present embodiment, it is possible to receive the proxy setting from any one of the monitoring devices even in a device that is excluded from management. Furthermore, in an environment where a plurality of monitoring devices is present, unnecessary processing of the monitoring devices can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-035093, filed Mar. 8 2022, which is hereby incorporated by reference wherein in its entirety.

What is claimed is:

1. A monitoring device having a proxy function that relays communication between a device management service and a network device comprising:
   a memory storing instructions; and
   a processor executing the instructions causing the monitoring device to:
   receive, from the network device, an event based on a failure of device registration with the device management service by the network device, wherein the device management service is deployed in a first network environment different from a second network environment in which the monitoring device and the network device are installed;
   acquire a device identifier and a first proxy setting from the network device;
   set, for the network device, a second proxy setting by using access information to the proxy function of the monitoring device, according to a determination that the network device is a management target to be monitored by the monitoring device based on the device identifier and the first proxy setting; and
   transmit, to the network device, a device registration instruction so that device registration processing with the device management service is performed by the network device.

2. The monitoring device according to claim 1,
   wherein the determination is performed based on device management information acquired from the device management service in addition to the device identifier and the first proxy setting.

3. The monitoring device according to claim 1,
   wherein if the network device is the management target and an instruction received from the network device is an instruction for processing continuation, the second proxy setting is set for the network device and the device registration instruction is transmitted to the network device for which the second proxy setting has been set.

4. The monitoring device according to claim 3,
   wherein if the instruction received from the network device is not an instruction for processing continuation, the second proxy setting is not set for the network device.

5. The monitoring device according to claim 1,
   wherein if, when another network device is not included in the management target, an instruction for processing continuation is further received from the another network device, the second proxy setting is set for the another network device.

6. The monitoring device according to claim 5,
   wherein the instruction for processing continuation further causes the monitoring device to perform an instruction for a communication test with the device management service via the proxy function to the another network device for which the second proxy setting has been set.

7. A control method of a monitoring device having a proxy function that relays communication between a device management service and a network device, the method comprising:
   receiving, from the network device, an event based on a failure of device registration with the device management service by the network device, wherein the device management service is deployed in a first network environment different from a second network environment in which the monitoring device and the network device are installed;
   acquiring a device identifier and a first proxy setting from the network device;
   setting, for the network device, a second proxy setting by using access information to the proxy function of the monitoring device, according to a determination that the network device is a management target to be monitored by the monitoring device based on the device identifier and the first proxy setting; and
   transmitting, to the network device, a device registration instruction so that device registration processing with the device management service is performed by the network device.

8. A non-transitory recording medium storing a control program of a monitoring device having a proxy function that relays communication between a device management service and a network device causing a computer to perform each step of a control method for the monitoring device, the method comprising:
   receiving, from the network device, an event based on a failure of device registration with the device management service by the network device, wherein the device management service is deployed in a first network environment different from a second network environment in which the monitoring device and the network device are installed;
   acquiring a device identifier and a first proxy setting from the network device;
   setting, for the network device, a second proxy setting by using access information to the proxy function of the monitoring device, according to a determination that the network device is a management target to be monitored by the monitoring device based on the device identifier and the first proxy setting; and transmitting, to the network device, a device registration instruction so that device registration processing with the device management service is performed by the network device.

\* \* \* \* \*